April 19, 1966 G. V. WOODLEY 3,247,361

REGULATOR

Filed July 9, 1962 4 Sheets-Sheet 1

INVENTOR.
GEORGE V. WOODLEY
BY
Robertson and Smythe
ATTORNEYS.

INVENTOR.
GEORGE V. WOODLEY
BY
Robertson and Smythe
ATTORNEYS.

April 19, 1966 G. V. WOODLEY 3,247,361

REGULATOR

Filed July 9, 1962

4 Sheets-Sheet 3

INVENTOR
GEORGE V. WOODLEY
BY
Robertson and Smythe
ATTORNEYS.

April 19, 1966 G. V. WOODLEY 3,247,361

REGULATOR

Filed July 9, 1962 4 Sheets-Sheet 4

INVENTOR
GEORGE V. WOODLEY

United States Patent Office 3,247,361

Patented Apr. 19, 1966

3,247,361

REGULATOR

George V. Woodley, Quincy, Mass., assignor to Basic Products Corporation, Milwaukee, Wis., a corporation of Wisconsin Filed July 9, 1962, Ser. No. 208,355
8 Claims. (Cl. 219—483)

This invention relates to the control of power to a plurality of electrical loads.

In prior devices, it has been difficult to sense the condition of a plurality of loads, such as heating loads, and to control the supply of electrical power thereto when using a single control means. This is particularly true, for example, in the control of glass furnaces or other similar electrical heating applications.

One of the objects of the invention is to provide a system which will control a plurality of loads from a single controller.

Another object of the invention is to provide an arrangement for controlling a plurality of loads linearly from a single condition responsive means.

Another of the objects of the invention is to provide an arrangement for controlling a plurality of loads by a static means which has a high degree of amplification.

Still another object of the invention is to provide a system wherein any of the loads can be adjusted without interaction between the loads.

In one aspect of the invention, a plurality of loads can be fed from an A.C. source, there being a saturable reactor means in the supply to said loads. In one form, there can be one saturable reactor or power modulator in the feed to transformers for each of the loads, and in another form, there can be a saturable reactor or power modulator arrangement in the feed to each of the transformers for each load. It is possible, of course, to eliminate the transformers or to use other means than a saturable reactor for control purposes, such as, for example, silicon controlled rectifier arrangements.

A condition responsive means, such as a temperature responsive arrangement, can be connected to each of the loads of the process. A regulating means is employed including a second harmonic type magnetic amplifier which receives the condition responsive signal and compares it with a reference signal. This is part of a regulating means which also includes a power amplifier arrangement connected to the magnetic amplifier. Feedback means also is used which is connected to the second harmonic type magnetic amplifier and feeds back a signal related to the voltage of at least one of the loads. The second harmonic type amplifier preferably has a tuning capacitor arrangement connected across its input windings for increasing the gain of the amplifier. Additionally, it may have a diode and resistance network arrangement connected across the input and feedback windings of the second harmonic type magnetic amplifier for the purpose of maintaining the second harmonic type amplifier in the desired region of amplification.

These and other objects, features and advantages of the invention will become apparent from the following description and accompanying drawings which are merely exemplary.

Figure 1:
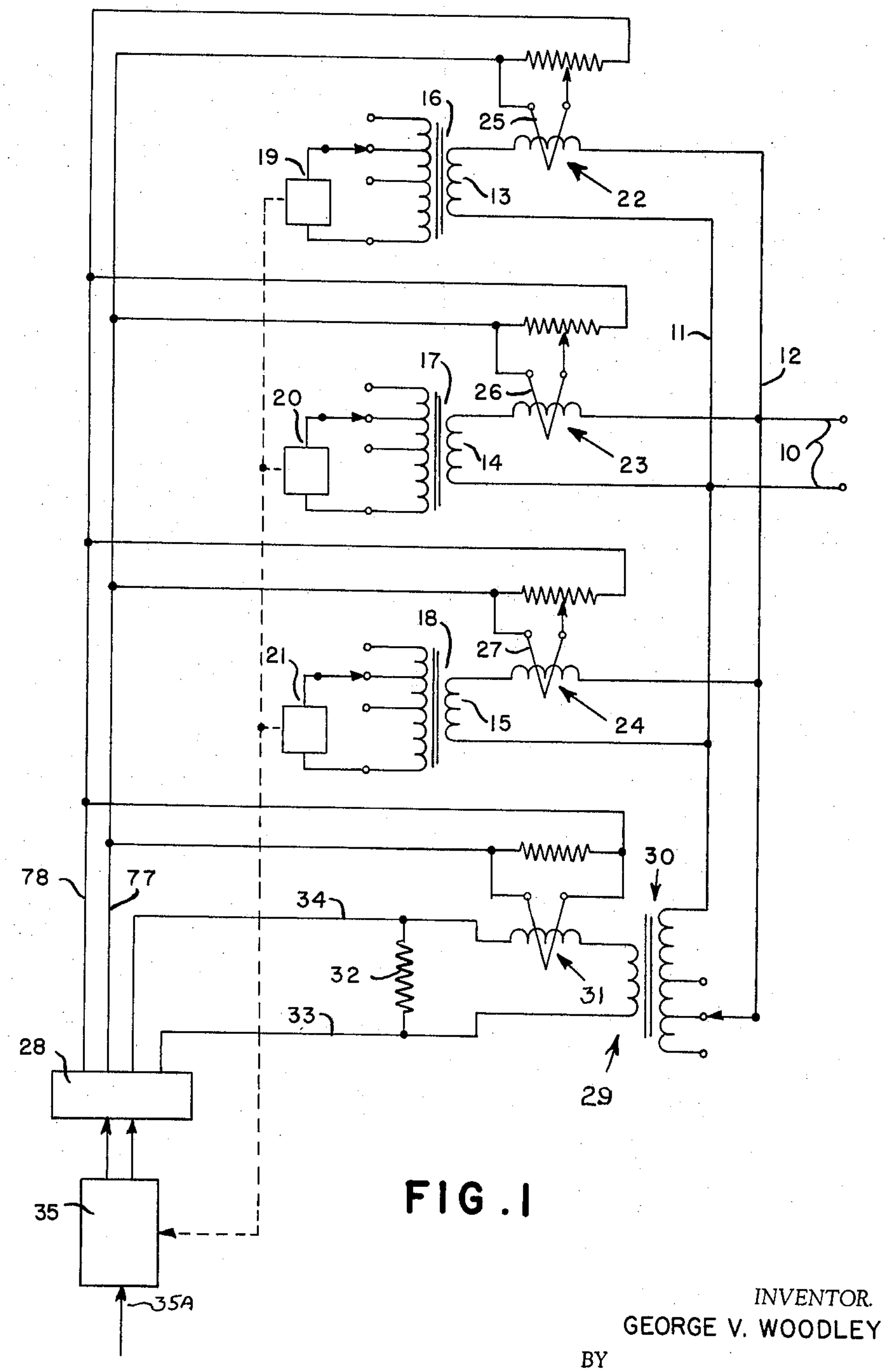
FIG. 1 shows a circuit diagram of one form of the invention.

Referring to FIG. 1, the source of power is supplied at 10 to leads 11, 12, the leads 11, 12 in turn being connected to primaries 13, 14 and 15 of load transformers 16, 17 and 18. These transformers are connected to loads 19, 20 and 21. The loads may be associated with a single process such as electric glass heating furnaces or may be a plurality of electrical loads. In the leads to each of the load transformers are saturable reactors 22, 23, 24. The D.C. control windings 25, 26, 27 of each of the saturable reactors are connected to the output terminals of the regulator shown schematically at 28. Each of the secondaries of the load transformers may have tap changing means as illustrated for individual adjustment of the loads.

Simulator network 29 may have a simulator transformer 30 connected to leads 11 and 12. Saturable reactor 31 is connected to simulator load 32.

Leads 33, 34 connect the feedback signal from across simulator load 32 to schematically indicated regulator 28. A condition responsive means 35 senses the condition in each of the loads and provides a signal in conjunction with a reference signal 35A to regulator 28.

Figure 3A:
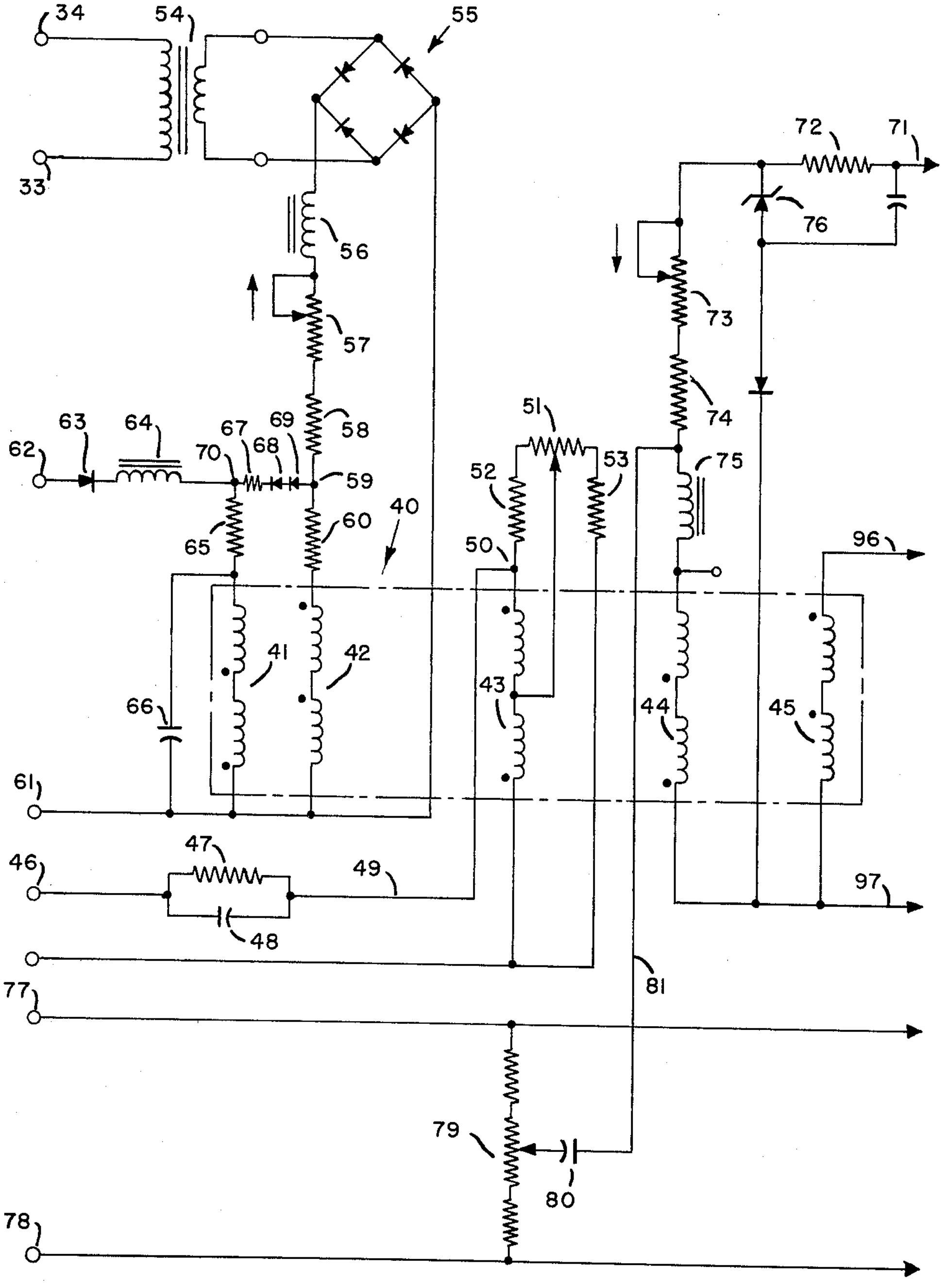
FIGS. 3A and 3B show the details of the second harmonic type magnetic amplifier and the power amplifier used in the arrangements in FIGS. 1 and 2.

The second harmonic type magnetic amplifier, which is part of the regulator 28, together with related circuits to be described is shown in FIG. 3A. The second harmonic type modulator in box 40 has input windings 41, feedback windings 42, excitation windings 43, bias windings 44 and output windings 45.

Excitation winding means 43 has line voltage fed thereto at terminal 46 through resistor 47, capacitor 48, lead 49, to junction 50. The network, comprising resistor 47 and capacitor 48 in parallel, supplies excitation to the second harmonic magnetic amplifier so as to increase the amplification thereof.

The null network 51 and resistors 52, 53 are connected to the ends and center of the excitation windings 43. Null network 51 is adjusted to compensate for magnetic differences between the cores of the second harmonic magnetic amplifier so that no output signal will be obtained at zero input signal.

Terminals 33, 34 are connected to the feedback transformer 54 which in turn is connected to a rectifier bridge 55, the rectifier bridge being connected to the feedback windings 42. One side of the bridge is connected through choke 56, resistor 57, resistor 58, terminal 59, resistor 60 to the upper end of feedback windings 42. Choke 56 provides a high impedance against induced voltages and preserves the gain of the amplifier. Resistance 57 is the gain adjustment for the feedback path.

Input windings 41 are connected across input circuit terminals 61 and 62 through diode 63, choke 64 and resistor 65. Tuning capacitor 66 is connected across input windings 41. Diode 63 serves to prevent interaction between the second harmonic type magnetic amplifier and the drive means. Choke 64 provides a high impedance in the control circuit to prevent voltage change disturbances and preserves the gain. Capacitor 66 tunes the reactance of the input windings and maximizes the amplification of the second harmonic magnetic amplifier. Resistor 67 and diodes 68, 69 are connected between terminal 59 and terminal 70. Diodes 68, 69 conduct current from terminal 59 of the feedback circuit to terminal 70 and through windings 41 of the input circuit when the voltage of terminal 59 exceeds that of terminal 70 by a specified amount, for example, 1.5 volts. By this means, the second harmonic magnetic amplifier is prevented from locking "on" in the presence of a large feedback signal, for example, which may occur on starting up the system.

Bias is supplied from line 71 to bias windings 44 through resistor 72, resistor 73, resistor 74 and choke 75. Zener diode 76 regulates the bias voltage.

An anti-hunt circuit is supplied from output terminals 77, 78 to resistance divider 79, anti-hunt capacitor 80 and lead 81. As can be seen, the anti-hunt circuit operates through the bias windings.

Figure 3B:
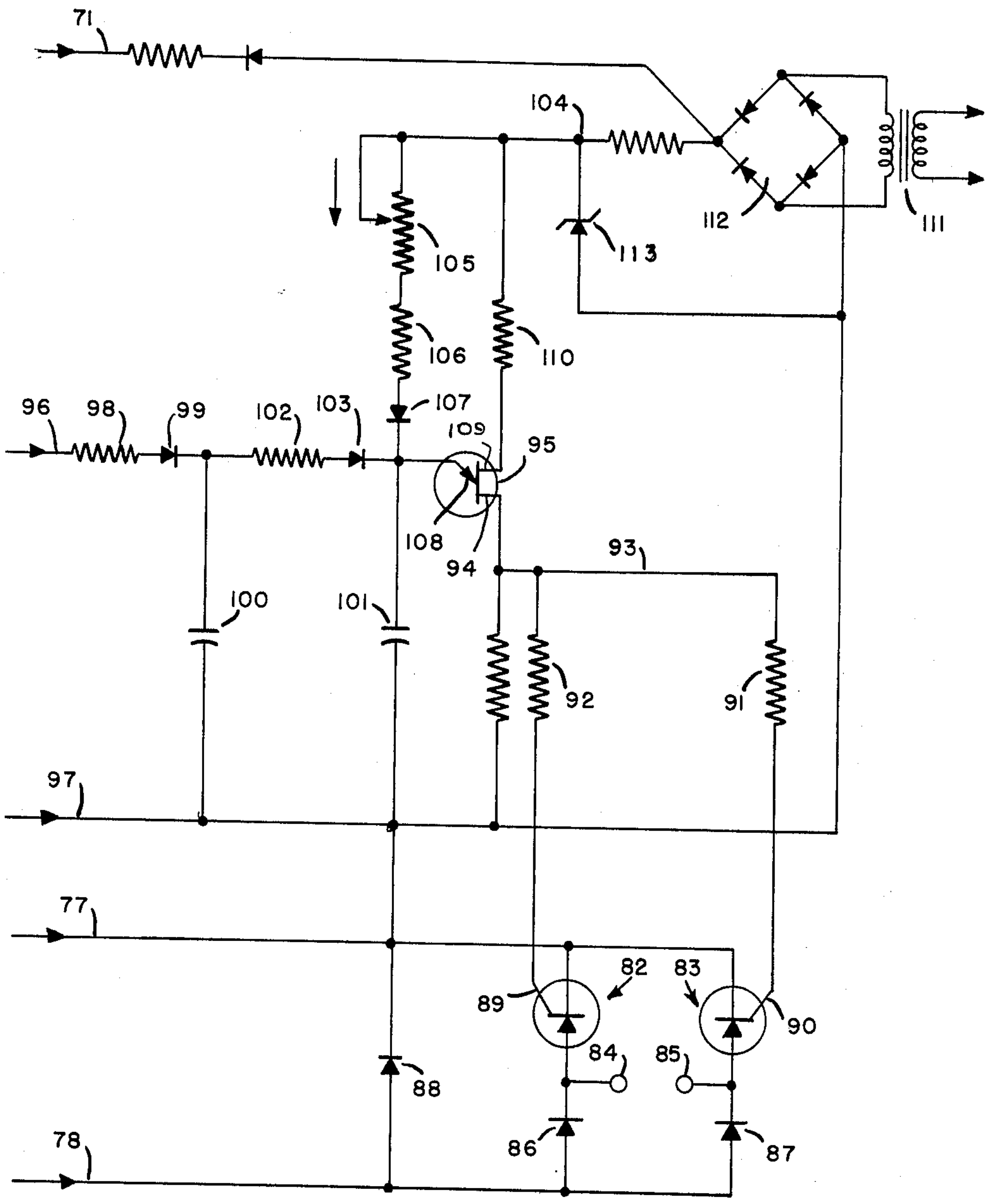

Referring to the power amplifier seen in FIG. 3B, silicon controlled rectifiers 82, 83 thereof have power supplied thereto at 84, 85. Diodes 86, 87 complete the rectifier bridge which includes silicon controlled rectifiers 82, 83. Free-wheeling diode 88 may be used for preserving the control of the silicon controlled rectifiers. Gating terminal 89 and gating terminal 90 of silicon controlled rectifiers 82, 83 are connected through resistors 91, 92 and lead 93 to base 94 of unijunction transistor 95. Output windings 45 of the second harmonic type modulator are connected by leads 96, 97 through resistor 98, and diode 99 to capacitor 100. Capacitor 101 is charged through resistor 102, diode 103 and regulated voltage from terminal 104 through resistance 105, resistance 106, and diode 107. Emitter 108 of unijunction transistor 95 is connected to charging capacitor 101. Base 1, 109, of unijunction transistor 95 is connected through resistor 110 to the regulated voltage at point 104. Supply transformer 111 is connected to rectifier bridge 112 which in turn feeds the regulated supply point 104, Zener diode 113 being connected thereacross.

Charging capacitor 101 receives charging current at a constant rate through resistors 105, 106 and diode 107, and through resistor 102 and diode 103 at a rate proportional to the output of the second harmonic magnetic amplifier. When the voltage of the charging capacitor 101 reaches a prescribed fraction of the regulated voltage at terminal 104, unijunction transistor 95 fires, allowing a pulse of current to pass through resistor 110 and through resistors 91, 92, which causes one of the silicon controlled rectifiers 82 and 83 to fire and conduct current to output terminals 77, 78. Output terminals 77 and 78 are connected to the control windings of the various saturable reactors 25, 26, 27. The output terminals 77, 78 also are connected to the control windings of saturable reactor 31. The charging capacitor 101 recharges cyclically firing the unijunction transistor 95 and supplying a sequence of gating pulses to the silicon controlled rectifiers.

Figure 2:
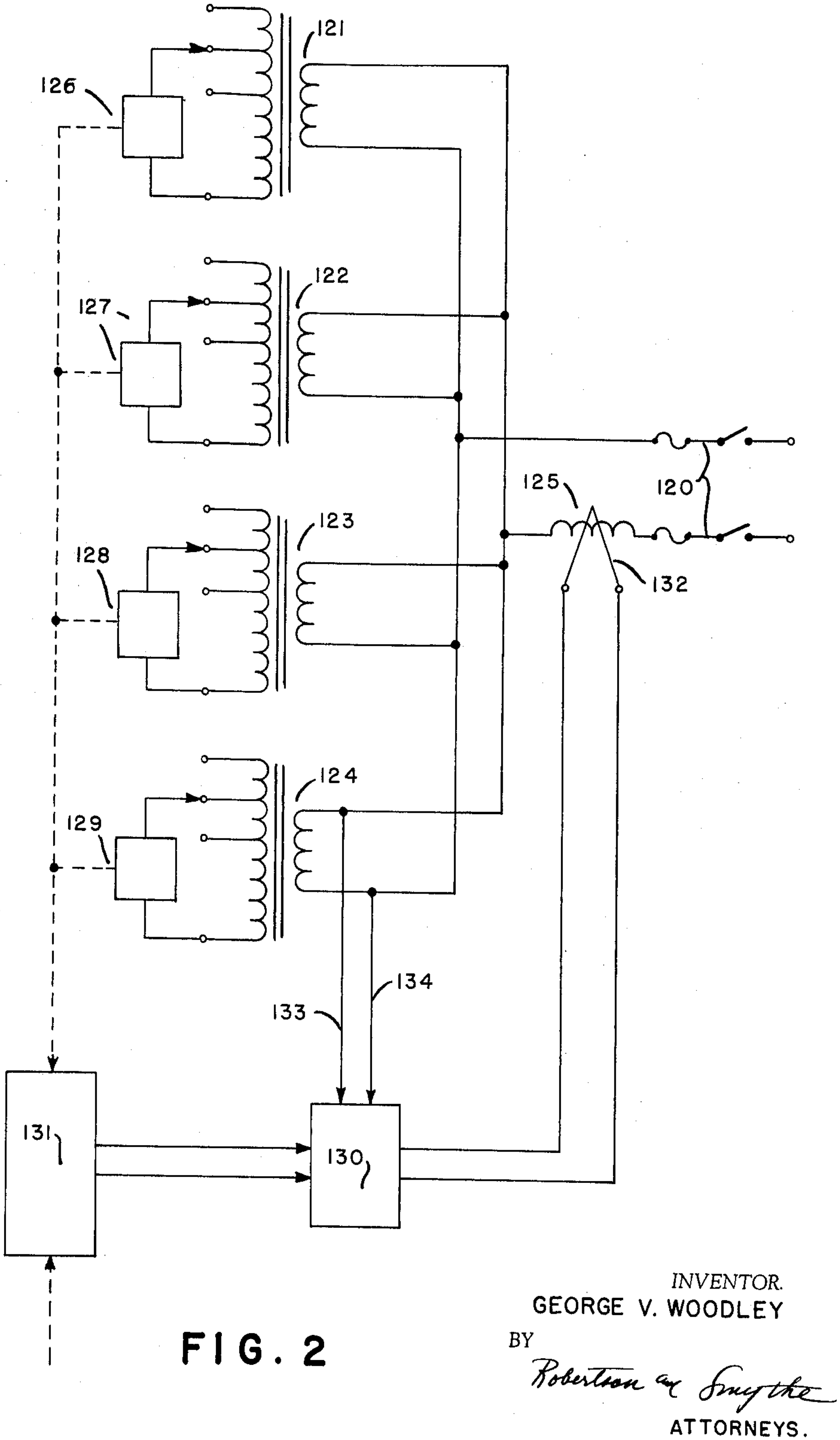
FIG. 2 shows a circuit diagram of another form of the invention.

Another form of the invention is illustrated in FIG. 2 wherein input A.C. is supplied at lines 120 to load transformers 121, 122, 123, 124. Saturable reactor 125 is located in the input circuit to said transformers. Loads 126, 127, 128, 129 are connected to the transformer in a manner similar to FIG. 1. Regulator 130 is connected to the condition responsive means 131 and to the control winding 132 of the saturable reactor 125. The feedback signal is fed by leads 133, 134 to the regulator 130.

It should be apparent that various modifications can be made in the arrangement and circuits without departing from the spirit of the invention as set forth in the appended claims.

What is claimed is:

1. In a system for controlling power to a plurality of heating loads, the combination including an A.C. source, a plurality of electrical heating loads, means connecting said A.C. source to said heating loads including at least one power modulator having control means, temperature responsive means connected to said heating loads for sensing the temperature of said loads, and regulating means connected to said temperature responsive means for controlling the operation of said control means, said regulating means including a second harmonic type magnetic amplifier for comparison and signal amplification, power amplifier means having an input and output circuit, said input circuit being connected to said magnetic amplifier and said output circuit forming the output circuit of said regulating means and being connected to the control means of said power modulator for controlling the power delivered to said heating loads, and feedback means connected to said second harmonic type amplifier for providing a feedback signal related to the voltage of said heating loads, said feedback means including a simulator load and a simulator network connecting said simulator load to said A.C. source, said simulator network including a power modulator having control means connected to the output circuit of said regulating means, so that the load voltage is proportional to the temperature sensed by said temperature responsive means.

2. In a system for controlling power to a plurality of heating loads, the combination including an A.C. source, a plurality of electrical heating loads, means connecting said A.C. source to said heating loads including at least one saturable reactor means having control winding means, temperature responsive means connected to said loads, and regulating means having an input circuit and an output circuit, said input circuit being connected to said temperature responsive means and said output circuit being connected to said control winding means, said regulating means including a second harmonic type magnetic amplifier in said input circuit for comparison and signal amplification, power amplifier means connected to said magnetic amplifier and being in said output circuit for controlling the current in said control winding means, and feedback means connected to said second harmonic type amplifier for providing a feedback signal related to the voltage of said heating loads, and feedback means including a simulator network connected to said A.C. source and having a simulator load and a power modulator for controlling the electrical energy delivered from said A.C. source to said simulator load, so that the load voltage is linearly proportional to the temperature sensed by said temperature responsive means.

3. In a system of controlling power to a plurality of heating loads, the combination including an A.C. source, a plurality of electrical heating loads, means connecting said A.C. source to said heating loads including at least one power modulator having control means, temperature responsive means connected to said loads, and regulating means having an input circuit and an output circuit, said output circuit being connected to said control means, said regulating means including a second harmonic type magnetic amplifier in said input circuit of said regulating means for comparison and signal amplification, said magnetic amplifier having input winding means in said input circuit, feedback winding means, excitation winding means, and output winding means, turning capacitor means in said input circuit connected across said input winding means for increasing the gain of said magnetic amplifier, said output circuit of said regulating means including power amplifier means connected to said magnetic amplifier, and feedback means connected to the feedback winding means of said second harmonic type amplifier providing a feedback signal related to the voltage of said loads so that the load voltage is proportional to said condition responsive means.

4. In a system for controlling power to a plurality of heating loads, the combination including an A.C. source, a plurality of electrical heating loads, means connecting said A.C. source to said heating loads including at least one saturable reactor means having control winding means, temperature responsive means connected to said loads, and regulating means connected to said control winding means, said regulating means including a second harmonic type magnetic amplifier for comparison and signal amplification, said magnetic amplifier having input winding means, feedback winding means, excitation winding means, and output winding means, said regulating means including tuning capacitor means connected across said input winding means for increasing the gain of said magnetic amplifier, power amplifier means connected to said magnetic amplifier, and feedback means connected to the feedback winding means of said second harmonic type amplifier for providing a feedback signal related to the voltage of said loads so that the load voltage is proportional to said condition responsive means.

5. In a system for controlling power to a plurality of heating loads, the combination including an A.C. source, a plurality of electrical heating loads, means connecting said A.C. source to said heating loads including at least one power modulator having control means, temperature responsive means connected to said loads, and regulating means connected to said control means, said regulating means including a second harmonic type magnetic amplifier for comparison and signal amplification, said magnetic amplifier having input winding means, feedback winding means, excitation winding means, and output winding means, said regulating means including tuning capacitor means connected across said input winding means for increasing the gain of said magnetic amplifier, diode and resistance network means connected across said input and feedback winding means so as to maintain said second harmonic magnetic amplifier in a predetermined region of amplification, power amplifier means connected to said magnetic amplifier, and feedbcak means connected to the feedback winding means of said second harmonic type amplifier for providing a feedback signal related to the voltage of said loads so that the load voltage is proportional to said condition responsive means.

6. In a system for controlling power a plurality of heating loads, the combination including an A.C. source, a plurality of electrical heating loads, means connecting said A.C. source to each of said heating loads, saturable reactor means in the connection to each of said loads, each saturable reactor means having control winding means, temperature responsive means connected to said loads, regulating means connected to said control winding means, said regulating means including a second harmonic type magnetic amplifier for comparison and signal amplification, said magnetic amplifier having input winding means, feedback winding means, excitation winding means, and output winding means, said regulating means including tuning capacitor means connected across said input winding means for increasing the gain of said magnetic amplifier, power amplifier means connected to said magnetic amplifier, and feedback means connected to said second harmonic type amplifier for providing a feedback signal related to the voltage of said loads so that the load voltage is proportional to said condition responsive means.

7. In a system for controlling power to a plurality of heating loads, the combination including an A.C. source, a plurality of electrical heating loads, means connecting said A.C. source to each of said heating loads, saturable reactor means in the connection to each of said heating loads, each saturable reactor means having control winding means, temperature responsive means connected to said loads, regulating means connected to said control winding means, said regulating means including a second harmonic type magnetic amplifier for comparison and signal amplification, said magnetic amplifier having input winding means, feedback winding means, excitation winding means, and output winding means, said regulating means including tuning capacitor means connected across said input winding means for increasing the gain of said magnetic amplifier, diode and resistance network means connected across said input and feedback winding means so as to maintain said second harmonic magnetic amplifier in a predetermined region of amplification, power amplifier means connected to said magnetic amplifier, and feedback means connected to said second harmonic type amplifier for providing a feedback signal related to the voltage of said loads so that the load voltage is proportional to said condition responsive means.

8. In a system for controlling power to a plurality of heating loads, the combination including an A.C. source, a plurality of electrical heating loads, means connecting said A.C. source to each of said heating loads, saturable reactor means in the connection to each of said heating loads, each saturable reactor means having control winding means, temperature responsive means connected to said loads, regulating means connected to said control winding means, said regulating means including a second harmonic type magnetic amplifier for comparison and signal amplification, said magnetic amplifier having input winding means, feedback winding means, excitation winding means, and output winding means, said regulating means including tuning capacitor means connected across said input winding means for increasing the gain of said magnetic amplifier, power amplifier means connected to said magnetic amplifier, feedback means connected to said second harmonic type amplifier for providing a feedback signal related to the voltage of said loads so that the load voltage is proportional to said condition responsive means, and charging cacapitor means connected to silicon controlled rectifier means for controlling a unijunction transistor connected to said control winding means.

References Cited by the Examiner

UNITED STATES PATENTS

| | | | |
|---|---|---|---|
| 2,673,324 | 3/1954 | Burton et al. | 323—89 |
| 2,753,514 | 7/1956 | Muchnic | 323—89 |
| 2,990,509 | 6/1961 | Hauck | 323—89 |

RICHARD M. WOOD, *Primary Examiner.*

LLOYD McCOLLUM, *Examiner.*